United States Patent [19]
Zane

[11] 3,967,475
[45] July 6, 1976

[54] COMBINATION BICYCLE LOCK AND MOUNTING BRACKET

[76] Inventor: Michael S. Zane, 85 Dean Road, Brookline, Mass. 02146

[22] Filed: Apr. 4, 1975

[21] Appl. No.: 565,131

[52] U.S. Cl. ................................. 70/18; 70/233; 224/39
[51] Int. Cl.² .................... E05B 73/00; B62J 7/00
[58] Field of Search ............ 70/14, 15, 18, 225–227, 70/233, 234; 211/5; 224/30, 31, 37–42, 34–36

[56] References Cited
UNITED STATES PATENTS

| | | | |
|---|---|---|---|
| 1,058,229 | 4/1913 | Futhey | 224/39 R |
| 1,503,210 | 7/1924 | Shannon | 70/18 |
| 3,648,908 | 3/1972 | Thompson | 224/39 R |
| 3,754,418 | 8/1973 | Miller | 70/18 |
| 3,800,570 | 4/1974 | Kaplan | 70/18 |
| 3,848,783 | 11/1974 | Falk | 224/42 |

FOREIGN PATENTS OR APPLICATIONS

| | | | |
|---|---|---|---|
| 406,598 | 12/1943 | Italy | 70/233 |
| 207,291 | 11/1923 | United Kingdom | 224/30 R |

*Primary Examiner*—Roy D. Frazier
*Assistant Examiner*—Lawrence J. Staab
*Attorney, Agent, or Firm*—Morse, Altman, Oates & Bello

[57] ABSTRACT

A bicycle lock comprised of a U-shaped shackle and a bolt lockable across the end of the shackle is detachably connected to a bracket mountable to the bicycle frame for storage purposes. The lock bolt is formed with a flat shank portion and an enlarged end portion. The shank portion passes through a pair of opposing slots formed at the ends of the shackle legs to engage a locking mechanism on one leg of the shackle. The enlarged end of the bolt prevents the bolt from passing through the shackle leg and also serves to engage the bracket. The bracket preferably is formed from two strips of metal bent and joined to define a pair of parallel leg sections with a pair of spaced apart semicylindrical portions one of which engages a part of the bicycle frame while the other engages the enlarged end of the bolt. Integral tab portions are formed on the free end of the bracket to extend through the shackle slot and against the shank of the bolt to hold the lock assembly in clamping engagement against the bracket. The lock assembly may be separated from the bracket by either unlocking the bolt from the shackle or bending the legs of the shackle together sufficiently to clear the tabs of the bracket.

3 Claims, 7 Drawing Figures

U.S. Patent July 6, 1976 3,967,475
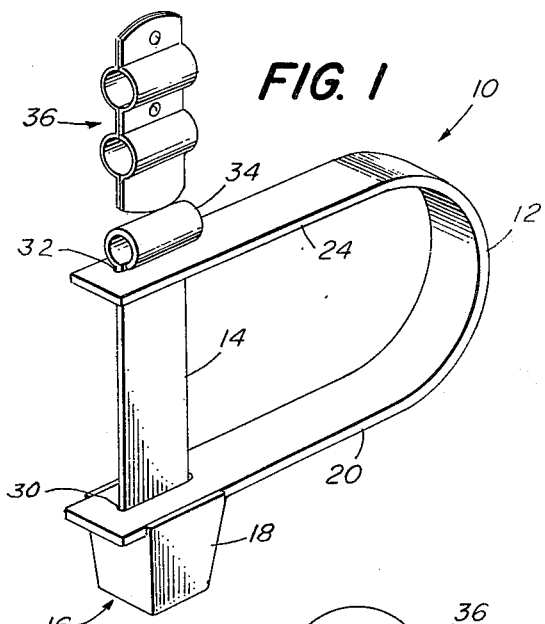
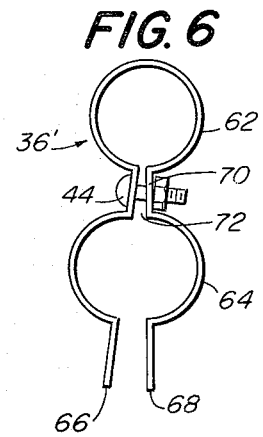
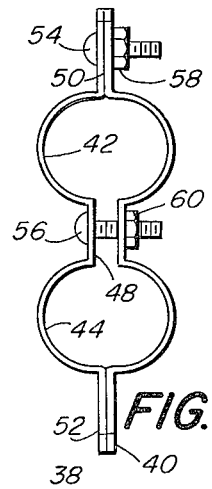
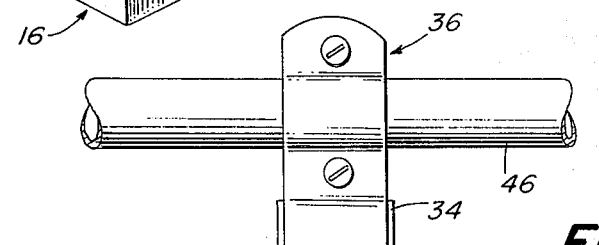
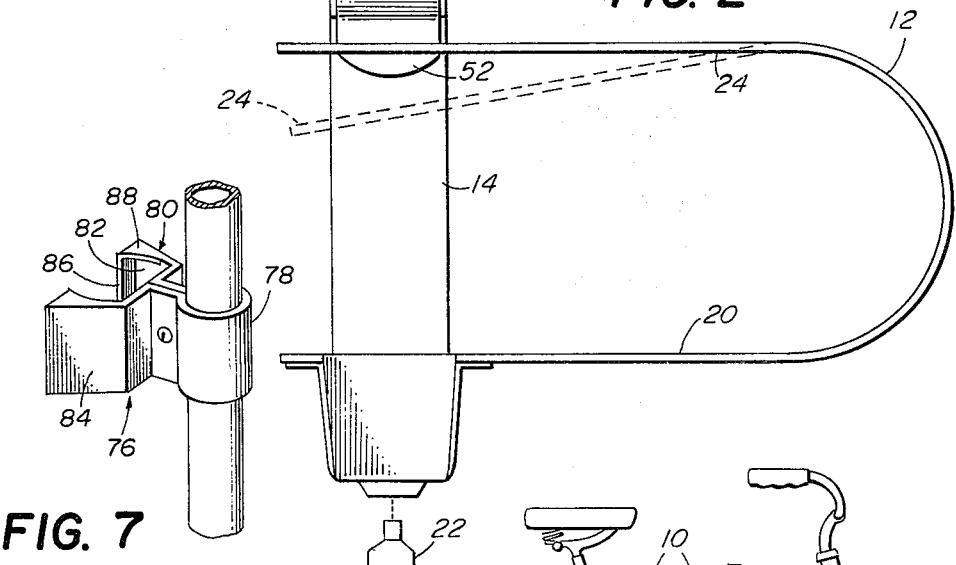
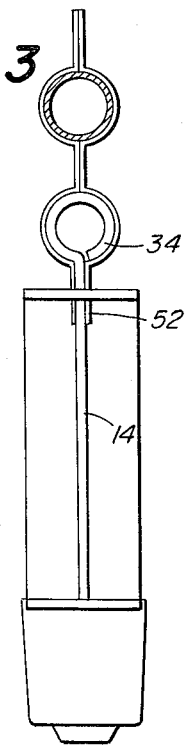
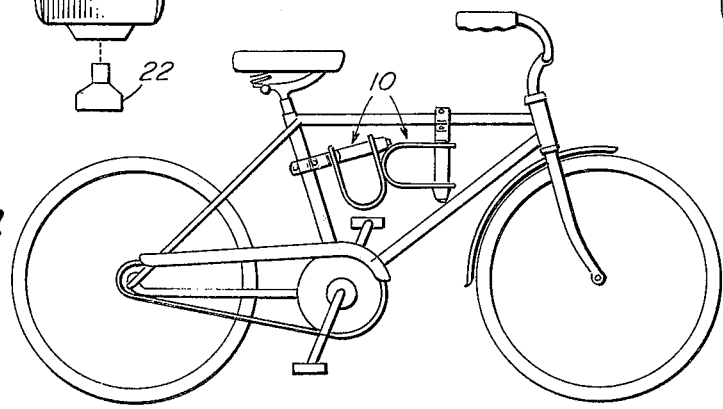

COMBINATION BICYCLE LOCK AND MOUNTING BRACKET

BACKGROUND OF THE INVENTION

1. Field of the Invention

This invention relates generally to locking devices and brackets and more particularly is directed towards a new and improved lock and bracket combination for use especially as a lock and storage bracket for bicycles and the like.

2. Description of the Prior Art

In U.S. Pat. No. 3,800,570 dated Apr. 2, 1974, entitled "Locking Mechanism" there is disclosed a bicycle lock comprised of a U-shaped shackle and a bolt adapted to pass through the wheel of a frame of a bicycle to span a fixed pole or other support. The ends of the shackle are closed by a bolt passed through the legs of the shackle and secured by a padlock engaging one end of the bolt. The padlock is protected by a socket which prevents an access by bolt cutters or the like.

In co-pending application Ser. No. 418,427 filed Nov. 23, 1973 entitled "Locks For Bicycles & The Like" there are disclosed improvements on the bicycle lock involving an integral, key-operated, rotary lock in place of a padlock on one leg of the shackle. Also disclosed in the co-pending application is a bracket mounted to the bicycle frame and adapted to attach the lock mechanism to the bicycle for storage when the lock is not in use.

It is an object of the present invention to provide improvements on the foregoing type of lock. Another object of this invention is to provide an improved mounting bracket and lock combination for storing the lock to the bicycle frame when the lock is not in use.

SUMMARY OF THE INVENTION

This invention features a lock mechanism and mounting bracket in which the lock mechanism is comprised of a U-shaped shackle and bolt and the bracket is comprised of a clamp mountable to the bicycle frame and engageable with the lock mechanism. The shackle is formed with a pair of slots in registration at opposite ends of the legs to receive the bolt passed therethrough. Means are provided for locking one end of the bolt to one leg of the shackle. The opposite end of the bolt is formed with an enlarged portion serving the double function of preventing separation of the bolt from the shackle and also providing means to attach the lock assembly to the bracket. The bracket is formed with an end portion that is contoured to conform with the enlarged portion of the bolt and having integral tabs to extend through the shackle slot to hold the lock to the bracket.

BRIEF DESCRIPTION OF THE DRAWINGS

FIG. 1 is an exploded perspective view of a lock and bracket made according to the invention, FIG. 2 is a view in side elevation showing the lock and bracket attached to the frame of a bicycle, FIG. 3 is a view in end elevation thereof, FIG. 4 is a view in side elevation showing the bracket and lock mounted in different possible positions to a bicycle, FIG. 5 is an end elevation of the bracket, FIG. 6 is an end elevation of a modification of the bracket, and, FIG. 7 is a perspective view of another modification of the bracket.

DETAILED DESCRIPTION OF THE PREFERRED EMBODIMENTS

Referring now to the drawings the reference character 10 generally indicates a locking mechanism which, in the preferred embodiment, is comprised of a U-shaped shackle 12 and a bolt 14 lockable across the open end of the shackle by means of an integral lock 16 mounted in a housing or bonnet 18 fixed to the outer face of a shackle leg 20 and near the end thereof as disclosed in Ser. No. 418,427. In the illustrated embodiment the lock 16 is operated by a key 22. Preferably the lock is of the cylindrical type to maximize protection against the lock being picked. In practice, the shackle and the bolt as well as the housing 18 are fabricated from a hard, tough material, preferably case hardened, cold rolled steel stock of perhaps 1½ inches in width and ⅛ inch in thickness. Obviously different sized stock and/or stainless steel or other material having similar characteristics may be used to advantage.

When used as a bicycle lock, the shackle 12 typically has a length of perhaps 9 inches or so, the legs being spaced apart approximately 4 inches. These dimensions are sufficient to accommodate the bicycle wheel to a post to which the bicycle may be locked. The parts may be of stainless steel stock or galvanized to prevent rusting and, preferably, at least the shackle may be covered with a layer of resilient material such as rubber, plastic or the like to prevent the lock parts from scratching the finished surface of the bicycle.

The shackle 12 is formed with two parallel legs 20 and 24 generally co-extensive with one another and each formed with a slot opening 30 and 32 respectively to receive the bolt 14 inserted therethrough. Each of the slots 30 and 32 is dimensioned slightly greater than the flat shank section of the bolt 14 in order to allow the bolt to slip easily in and out of locking position. One end of the bolt 14, as best shown in FIGS. 1 and 3, is bent into a circular loop 34 providing a double-function, first as a stop for the bolt and to prevent the legs 24 of the shackle from being bent outwardly to separate the shackle and bolt and, secondly, to serve as a connector for storing the lock 10 to a bracket 36 when the lock is not in use.

The bracket 36 of the principal embodiment is comprised of matching parts 38 and 40 bent or otherwise shaped from a strip of stainless steel or the like, of perhaps 1¼ inches width into two matching parts 38 and 40. Each part is formed with semi-cylindrical sections 42 and 44 having a radius of curvature such that when the parts 38 and 40 are pressed together they will form cylindrical openings dimensioned to accommodate a tubular section 46 of the bicycle frame within the upper opening of the bracket while the lower cylindrical opening of the bracket will be dimensioned to receive the loop 34 on the end of the bolt 14. In practice, the diameter of the loop 34 may be made to correspond with the diameter of the tubular frame section 42 normally about 1 inch. Each part 38 and 40 also includes a flat medial portion 48 of perhaps 1½ inches long extending between the two arcuate portions 42 and 44. At opposite ends of each part is a tab 50 and 52 typically ½ inch or so in length.

Both the upper tabs 50 and the medial portions 48 are perforated to receive bolts 54 and 56 to which are threaded nuts 58 and 60. When initially formed, the opposing medial portions 48 of each part are spaced apart from one another as shown in FIG. 5 while the upper and lower tabs 50 and 52 are in contact with one another. Thus, when the upper cylindrical portion of the bracket is fitted to the crossbar 46 of the bicycle, for example, and the nuts and bolt 56 and 60 are tightened, the bracket will be tightly clamped to prevent slipping or rotation of the bracket with respect to the bicycle frame.

The lock 10 is attached to the bracket 36 preferably by inserting the bolt 14 through the slots in the legs so as to lock the flat end of the bolt into the bonnet 18 with the looped end 34 in its normal position as shown in FIG. 1. With the bolt locked in place, the shackle leg 24 is manually depressed inwardly towards the leg 20 for perhaps 1 inch and the loop 34 is then inserted in the lower cylindrical socket of the bracket 36. Once the loop is fully inserted within the cooperating socket, the leg 24 is released and the leg will return to its normal position parallel to the leg 20 with the tabs of the bracket lying flat on opposite sides of the bolt as shown in FIG. 3 and extending through the slot 32 in the leg 24 of the shackle. In this position, the lock assembly 10 is firmly mounted to the bracket and cannot be moved in any direction insofar as the tabs prevent lengthwise displacement of the lock as well as rotational movement thereof because of their engagement of the bolt and positioning through the slot. The bracket may be mounted to the frame of the bike in a number of different positions as suggested in FIG. 4 as most convenient to the rider. While the lock shown is of the type with the integral locking bonnet 18 it may also be used with the lock of the Kaplan U.S. Pat. No. 3,800,570 cited above where a padlock secures the bolt to the shackle and in which case the bolt would be formed with a loop at its free end.

Referring now to FIG. 6 of the drawings, there is illustrated a modification of the invention and, in this embodiment, a bracket 36' is formed of a single strip of metal into a cylindrical upper section 62 and a cylindrical lower section 64 with downwardly extending tabs 66 and 68. The cylindrical sections are joined by flat medial portions 70 as in the principal embodiment, these portions being secured by a nut 72 and bolt 74. It will be understood that the upper section 62 is fitted to the frame of the bike as in the principal embodiment while the lower portion 64 receives the loop end of the bolt. The nut 72 and bolt 74 serve to clamp the bracket to the bicycle frame.

Referring now to FIG. 7 of the drawings, there is illustrated a further modification of the invention and, in this embodiment a bracket 76 is formed with a cylindrical clamp portion 78 to be fastened to the bicycle frame and a socket portion 80 to receive the bonnet 18 of the lock. This bracket may be made of resilient metal or plastic and the socket 80 contoured to snap over the bonnet 18 when the two are pressed together. The socket 80 includes side walls 82 and 84 each with an inwardly projecting lip 80 and end shoulders 88 to prevent movement of the lock when the bonnet is fully within the socket.

While the invention has been described with particular reference to the illustrated embodiments, numerous modifications thereto will appear to those skilled in the art. For example, the configuration of the loop 34 may be modified to other shapes and the lower portions of the bracket may be modified to match with the configuration of the loop. Ellipses and other shapes may be used to advantage.

Having thus described the invention what I claim and desire to obtain by Letters Patent of the United States is:

1. A bicycle locking system, comprising,
   a. a lock, said lock including a U-shaped shackle formed with a slot near the end of each leg thereof,
   b. a bolt detachably connected to said shackle and dimensioned to pass through said slots to close the end of said shackle, and,
   c. locking means operatively associated with said lock for locking one end of said bolt to one shackle leg,
   d. the other end of said bolt being formed with an enlargement to prevent passage thereof through the slot of the other shackle leg, in combination with
   e. a bracket, said bracket including a frame-engaging clamp portion at one end and an integral socket portion extending out from said clamp portion and receiving the enlargement of said bolt,
   f. said bolt being formed with a flat shank portion and cylindrical enlargement and said bracket socket being cylindrical,
   g. said bracket being formed with thin flat tabs adjacent said socket and extending through the slot of the other shackle leg and lying flat against opposite sides of said shank.

2. A bicycle locking system, comprising
   a. a lock, said lock including a U-shaped shackle formed with a slot near the end of each leg thereof,
   b. a bolt detachably mounted to said shackle and dimensioned to pass through said slots to close the end of said shackle, and
   c. locking means operatively associated with said lock for locking one end of said bolt to one shackle leg,
   d. the other end of said bolt being formed with an enlargement to prevent passage thereof through the slot of the other shackle leg, in combination with
   e. a bracket, said bracket including a frame-engaging clamp portion at one end and an integral socket portion extending from said clamp portion and receiving said enlargement,
   f. said bolt being formed with a flat shank portion and a symmetrical enlargement, said bracket being formed from thin, slightly flexible, rigid strip material to define a pair of legs joined at one end and the midportion thereof, said legs defining a pair of sockets one adjacent said one end adapted to engage said bicycle frame and the other adapted to receive said enlargement,
   g. each bracket leg being formed with a tab at the free end thereof extending through the slot of the other shackle leg and lying flat against opposite sides of said shank portion.

3. A system according to claim 2 wherein both of said sockets and said enlargement are cylindrical.

* * * * *